Aug. 25, 1959  E. G. JONES  2,901,215
POST DRIVER

Filed Oct. 18, 1954  2 Sheets-Sheet 1

Edwin G. Jones
INVENTOR.

BY
Attorneys

Aug. 25, 1959  E. G. JONES  2,901,215
POST DRIVER
Filed Oct. 18, 1954  2 Sheets-Sheet 2

Edwin G. Jones
INVENTOR.

United States Patent Office 2,901,215
Patented Aug. 25, 1959

2,901,215

POST DRIVER

Edwin G. Jones, New Ulm, Minn.

Application October 18, 1954, Serial No. 462,854

3 Claims. (Cl. 254—29)

This invention relates in general to new and useful improvements in farm machinery, and more specifically to an improved post driver attachment for tractors.

One of the constant tasks about a farm is the replacing of fence posts. While there have been devised all types of machinery including augers for drilling fence post holes, there has not been provided suitable equipment of a simple nature which may be secured to a tractor for driving fence posts without first drilling holes for such posts.

It is therefore the primary object of this invention to provide an improved post driver which is so constructed whereby it may be readily attached to a tractor and operated by the operator of such tractor.

Another object of this invention is to provide an improved post driver attachment which is self-contained with the exception of the use of motivating force from the tractor and which is so constructed whereby it may be conveniently attached to and removed from a tractor.

A further object of this invention is to provide an improved post driver attachment for tractors which utilizes the hydraulic system of the tractor, the post driver including a hydraulic cylinder having an extensible plunger and being provided with suitable drive means for connecting the hydraulic cylinder to a post driving cap.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
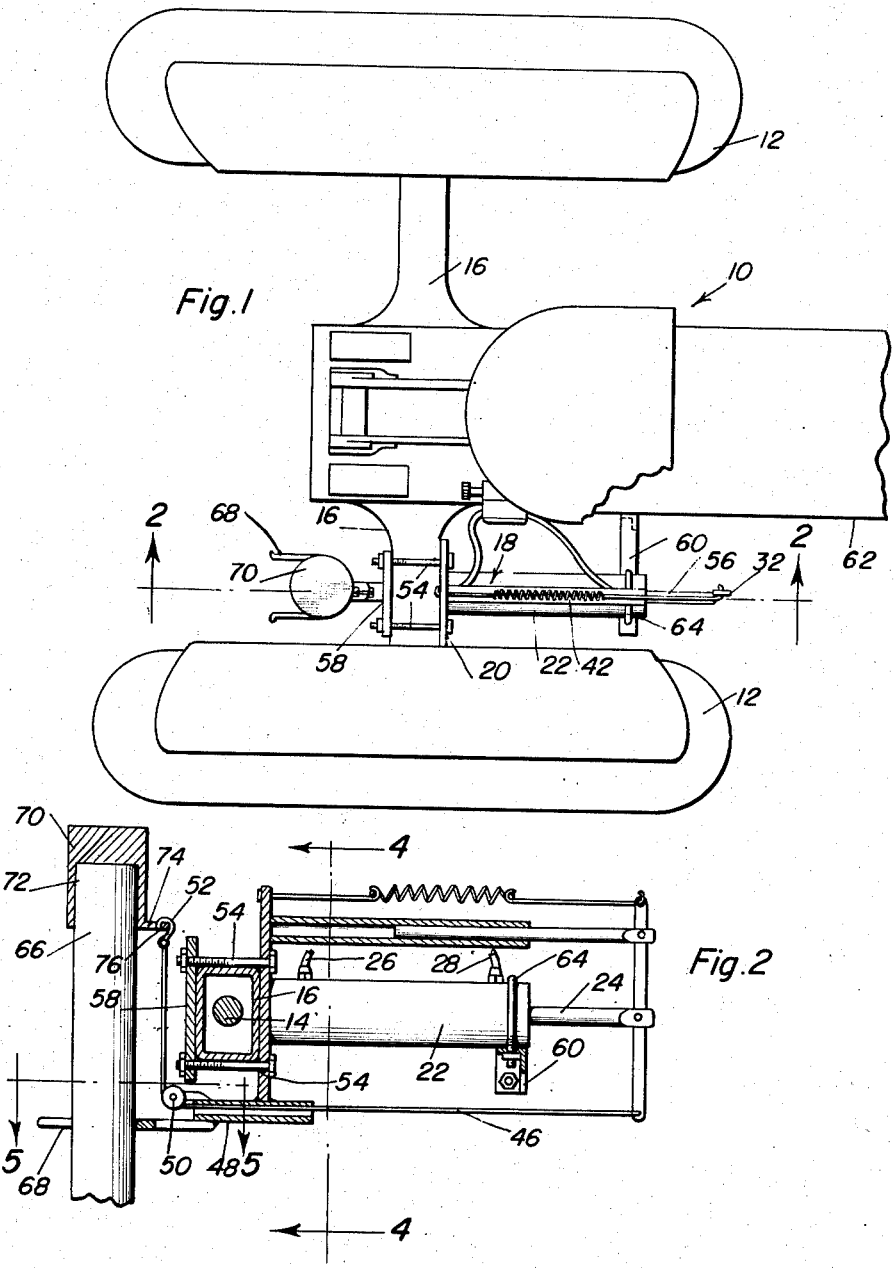
Figure 1 is a top plan view of the rear portion of a conventional tractor and shows attached to the rear axle housing thereof the fence post driver which is the subject of this invention.
Figure 2 is an enlarged fragmentary vertical sectional view taken substantially upon the plane indicated by the section line 2—2 of Figure 1 and shows the general details of the post driver and the mode of connecting the same to the tractor rear axle housing.
Figure 4:
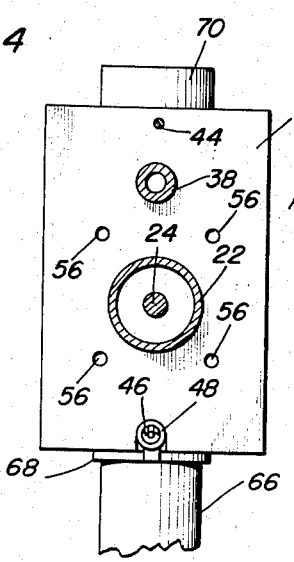
Figure 5:
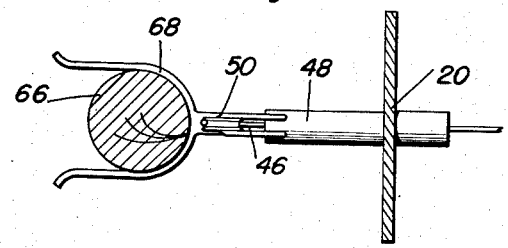

Figure 4 is an enlarged fragmentary vertical sectional view taken substantially upon the plane indicated by the section line 4—4 of Figure 2 and shows the arrangement of various parts of the post driver attachment; and Figure 5 is a fragmentary enlarged horizontal sectional view taken substantially upon the plane indicated by the section line 5—5 of Figure 2 and shows the details of a post guide carried by a mounting plate of the post driver attachment.

Referring now to the drawings in detail, it will be seen that there is illustrated in Figure 1 a conventional type of farm tractor which is referred to in general by the reference numeral 10. The farm tractor 10 includes rear wheels 12 carried by outer ends of rear axles 14, the rear axles 14 being mounted in rear axle housings 16.

The tractor 10 also includes a hydraulic system (not shown).

Figure 3:
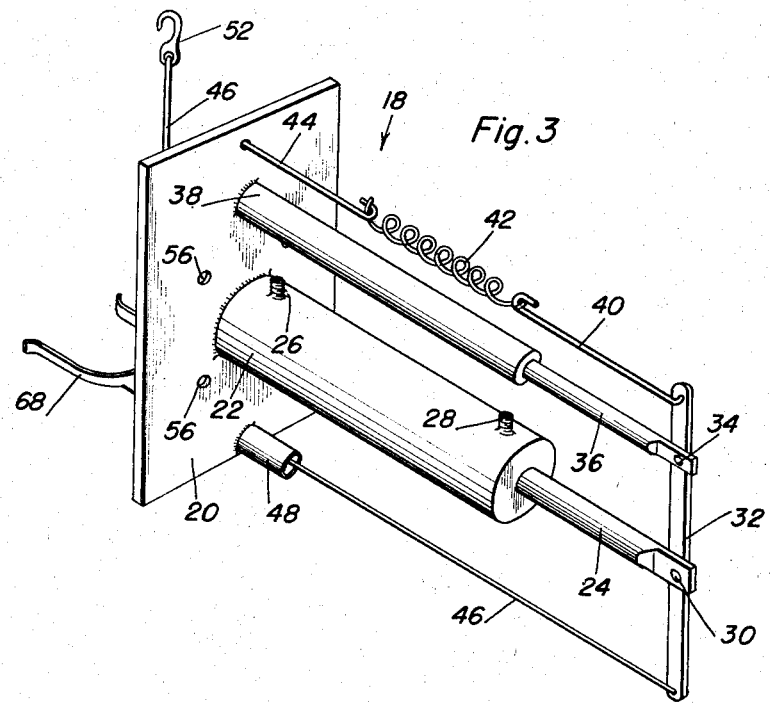
Figure 3 is an enlarged perspective view of the post driver attachment as it appears removed from the tractor.

Removably clamped to one of the rear axle housings 16 and extending both forwardly and rearwardly therefrom is the post driver attachment which is the subject of this invention, the post driver attachment being referred to in general by the reference numeral 18. As is best illustrated in Figure 3, the post driver attachment 18 includes a generally rectangular mounting plate 20 which is normally vertically disposed. Rigidly secured to a forward face of the mounting plate 20 and extending forwardly therefrom is a fluid motor or an extensible fluid cylinder 22 which includes an extensible plunger 24. The fluid cylinder 22 includes suitable fluid line connections 26 and 28 and is intended to be connected to the hydraulic system of the tractor 10 for operation thereby.

Carried by the forward end of the extensible plunger 24 and rigidly connected thereto by a suitable fastener 30, e.g. a rivet, is a bar 32. The bar 32 has rigidly connected to the upper portion thereof by a fastener 34 such as a rivet, a rearwardly extending guide rod 36 which is telescopically received in a forwardly extending guide tube 38 which is suitably secured to the forward face of the mounting plate 20.

Connected to the extreme upper end of the bar 32 is a connecting rod 40 whose opposite end is connected to a coil spring 42 whose opposite end is still further connected to a rod 44 carried by the forward face of the mounting plate 20, the coil spring 42 being for the purpose of returning the plunger 24 to its initial retracted position at the termination of a post driving operation.

Secured to the lower end of the bar 32 is a flexible connector 46. The flexible connector 46 extends rearwardly in parallel relation to the guide rod 36 and the connecting rod 40 and passes through a tubular guide member 48 carried by the lower portion of the mounting plate 20 and extending therethrough. As is best illustrated in Figure 2, carried by the rear end of the tubular guide member 48 above the center line thereof is a guide pulley 50 over which the flexible connector 46 is entrained. The flexible connector 46 extends upwardly from the guide pulley 50 and is provided at its free end with a hook 52.

The post driver attachment 18 is secured to the rear axle housing 16 by a plurality of bolts 54 which extend rearwardly through suitable openings 56 in the mounting plate 20. The bolts 54 pass above and below the rear axle housing 16, as is best illustrated in Figure 2, and clamp a clamp plate 58 against the rear surface of the rear axle housing 16.

The forward part of the post driver attachment 18 is braced by a bracket 60 which extends outwardly from the frame 62 of the tractor 10 and underlies a forward portion of the cylinder 22. The cylinder 22 is clamped to the bracket 60 by a suitable U-bolt 64.

In order that a post to be driven, such as the post 66, may be guided with respect to the post driver attachment 18, there is provided a post guide 68. As is best illustrated in Figure 5, the post guide 68 is in the form of a fork-like member and is secured to the underside of the rear part of the tubular guide member 48, as is best illustrated in Figure 2.

In order that a post, such as the post 66, may be driven or pushed down into the ground, there is provided a suitable post cap 70. The post cap 70 is provided on the underside thereof with a socket 72 for receiving the upper part of a post, such as the post 66. The lower part of the post cap 70 is provided with a forwardly projecting flange 74 having a vertical aperture 76 therein receiving the hook 52.

When it is desired to drive a post, such as the post 66, into the ground, the tractor 10 is so positioned whereby the post guide 68 is aligned with the spot at which the post 66 is to be driven. A post 66 is then vertically positioned in the post guide 68 and the post cap 70 positioned thereon. Then, by actuating the controls (not shown) for the hydraulic system of the tractor 10, fluid may be admitted to the fluid cylinder 22 to extend the extensible plunger 24 thereof. This results in the forward movement of the flexible connector 46 and inasmuch as the flexible connector 46 is passed over the guide pulley 50, the rear portion thereof will move downwardly. Downward movement of the rear portion of the flexible connector 46 will result in corresponding downward movement of the post cap 70 and the pushing of the post 66 down into the ground.

Inasmuch as only a relatively few bolts are utilized to secure the post driver attachment 18 to the tractor 10, it is readily apparent that it may be easily attached thereto and removed therefrom. Further, because of the relatively small size and the compactness of the post driver attachment 18, it may be readily stored.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a tractor of the type which includes a rear axle housing having a forwardly facing surface, a post driver attachment, said post driver attachment comprising a vertical mounting plate, clamp members carried by said mounting plate clamping said mounting plate against said forward facing surface of said rear axle housing, a horizontal fluid cylinder secured to said mounting plate and projecting forwardly therefrom, a fluid pressure responsive piston rod reciprocably supported by and projecting from the other end of the fluid cylinder, a post cap for receiving an upper end of a post to be vertically driven, drive means including a flexible force transmitting connector operatively connected to and extending between said cap and said piston rod, direction changing guide means engaged with an intermediate portion of said flexible connector and carried by said mounting plate rearwardly of said rear axle housing, and a post guide extending rearwardly from said mounting plate beyond said direction changing guide means for receiving a post being driven and engaging the periphery of such post in guided relation.

2. The combination of claim 1 wherein said fluid cylinder is aligned with a side of said rear axle housing whereby pressure is exerted on said mounting plate by said fluid cylinder and directly transferred to said rear axle housing.

3. In combination with a tractor of the type which includes a rear axle housing having a forwardly facing surface, a post driver attachment, said post driver attachment comprising a vertical mounting plate, clamp members carried by said mounting plate clamping said mounting plate against said forward facing surface of said rear axle housing, a horizontal fluid cylinder secured to said mounting plate and projecting forwardly therefrom, a fluid pressure responsive piston rod reciprocably supported by and projecting from the other end of the fluid cylinder, a post cap for receiving an upper end of a post to be vertically driven, drive means including a flexible force transmitting connector operatively connected to and extending between said cap and said piston rod, direction changing guide means engaged with an intermediate portion of said flexible connector and carried by said mounting plate rearwardly of said rear axle housing, and a post guide extending rearwardly from said mounting plate beyond said direction changing guide means for receiving a post being driven and engaging the periphery of such post in guided relation, said post guide being generally U-shaped and opening away from said direction changing means, the connection between said cap and said flexible force transmitting connector being disposed along a vertical line passing between said post guide and said direction changing means whereby a post being driven is urged into engagement with said post guide by said cap.

References Cited in the file of this patent

UNITED STATES PATENTS

| | | |
|---|---|---|
| 2,209,885 | Hall et al. | July 30, 1940 |
| 2,244,899 | Smith | June 10, 1941 |
| 2,645,453 | Nelson | July 14, 1953 |
| 2,681,789 | Nichols | June 22, 1954 |
| 2,747,305 | Marshall | May 29, 1956 |